(12) United States Patent
Khesin et al.

(10) Patent No.: US 7,765,209 B1
(45) Date of Patent: Jul. 27, 2010

(54) INDEXING AND RETRIEVAL OF BLOGS

(75) Inventors: Alex Khesin, Hoboken, NJ (US);
Andriy Bihun, Pine Bush, NY (US);
Eduardo Morales, Harrison, NJ (US);
Jason Goldman, San Francisco, CA (US); Jeff Reynar, New York, NY (US);
Vinod Marur, Berkeley Heights, NJ (US)

(73) Assignee: Google Inc., Mountain View, CA (US)

( * ) Notice: Subject to any disclaimer, the term of this patent is extended or adjusted under 35 U.S.C. 154(b) by 359 days.

(21) Appl. No.: 11/224,310

(22) Filed: Sep. 13, 2005

(51) Int. Cl.
*G06F 17/30* (2006.01)

(52) U.S. Cl. .................. 707/736; 707/711; 707/741

(58) Field of Classification Search ............ 707/1, 707/3, 10, 101, 104.1
See application file for complete search history.

(56) References Cited

U.S. PATENT DOCUMENTS 6,826,576 B2 * 11/2004 Lulich et al. ............... 707/102
2006/0004691 A1 * 1/2006 Sifry ............................ 707/1
2006/0004703 A1 * 1/2006 Spivack et al. ............... 707/2
2006/0069663 A1 * 3/2006 Adar et al. ................... 707/1
2006/0284744 A1 * 12/2006 Shotland ..................... 341/50
2006/0287989 A1 * 12/2006 Glance ........................ 707/3
2007/0038646 A1 * 2/2007 Thota ....................... 707/100
2007/0050389 A1 * 3/2007 Kim et al. .................. 707/101

OTHER PUBLICATIONS

Bloglines, www.bloglines.com, print date—Sep. 12, 2005.
Blogpulse, www.blogpulse.com, print date—Sep. 12, 2005.
Technorati, www.technorati.com, print date—Sep. 12, 2005.
Feedster, www.feedster.com, print date—Sep. 12, 2005.
Icerocket, www.icerocket.com, print date—Sep. 12, 2005.
MarketingVox, www.marketingvox.com, print date—Sep. 12, 2005.

* cited by examiner

*Primary Examiner*—Charles Rones
*Assistant Examiner*—Rezwanul Mahmood
(74) *Attorney, Agent, or Firm*—Harrity & Harrity, LLP

(57) ABSTRACT

A system may receive a feed associated with a blog. The system may extract information from the feed and the blog and create a hybrid document based on the extracted information. The system may further use the hybrid document to determine a relevance of the blog to a search query.

38 Claims, 11 Drawing Sheets

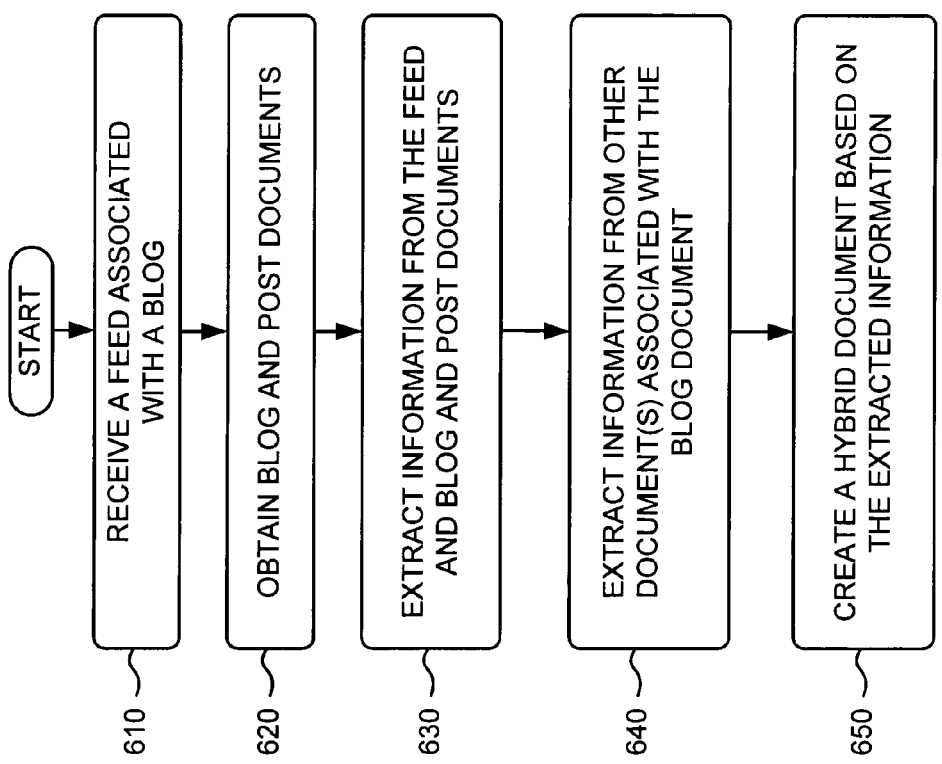

FIG. 7

```
<feed xmlns="http://purl.org/atom/ns#" version="0.3" xml:lang="en-US">
<title mode="escaped" type="text/html">Goldtoe Lemon.Nut</title>     ← BLOG TITLE
<link href="http://goldtoe.net" rel="alternate" title="Goldtoe Lemon.Nut" type="text/html" />
<modified>2005-08-16T19:25:45Z</modified>
<generator url="http://www.blogger.com/" version="5.15">Blogger</generator>
<entry xmlns="http://purl.org/atom/ns#">
<author>
<name>Goldtoe</name>     ← POST AUTHOR
</author>
<issued>2005-08-07T00:00:00-07:00</issued>   ⎫
<modified>2005-08-07T07:35:17Z</modified>    ⎬ TIMESTAMPS
<created>2005-08-07T07:35:16Z</created>      ⎭
<link href="http://goldtoe.net/2005/08/mediated.html" rel="alternate" title="Mediated" type="text/html" />
<id>tag:blogger.com,1999:blog-5800311.post-112340011652561575</id>
<title mode="escaped" type="text/html">Mediated</title>     ← POST TITLE
<content type="application/xhtml+xml" xml:base="http://goldtoe.net" xml:space="preserve">

<div xmlns="http://www.w3.org/1999/xhtml">
Le Cheval 2.1 is a 90 second film that was shown tonight before Me, You and Everyone We Know.
Both movies are absolutely incredible. But you can watch Le Cheval 2.1 on the internet
<a href="http://www.depict.org/content/films/2003/le_cheval_480.html">right now</a>     ← POST CONTENT
```

700

INDEXING AND RETRIEVAL OF BLOGS

FIELD OF THE INVENTION

Implementations consistent with the principles of the invention relate generally to information retrieval and, more particularly, to indexing and retrieval of blogs.

BACKGROUND OF THE INVENTION

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are identified as search results and are returned to the user as links.

Over the past few years, a new medium, called a blog, has appeared on the web. Blogs (short for web logs) are publications of personal thoughts that are typically updated frequently with new journal entries, called posts. The content and quality of blogs and their posts can vary greatly depending on the purpose of the authors of the blogs. As blogging becomes more popular, the ability to provide quality blog search results becomes more important.

SUMMARY OF THE INVENTION

In accordance with one implementation consistent with the principles of the invention, a method may include receiving a feed; fetching a blog and one or more posts associated with the feed; extracting information from the feed, the blog, and one or more posts; creating a hybrid document based on the extracted information; and using the hybrid document to determine a relevance of the blog or the one or more posts to a search query.

In another implementation consistent with the principles of the invention, a device includes a memory to store instructions and a processor. The processor executes the instructions to receive a search query, determine a relevance of a blog or a blog post to the search query based on information extracted from the blog or blog post and information extracted from at least one other source, and provide information relating to the blog or the blog post when the blog or the blog post is determined to be relevant to the search query.

In yet another implementation consistent with the principles of the invention, a method may include receiving a search query; determining a relevance of a first set of documents to the search query using a second set of documents, where the first set of documents includes blogs and blog posts and the second set of documents includes hybrid documents created from the first set of documents and at least one other source; and providing information regarding documents in the first set of documents determined to be relevant.

In still another implementation consistent with the principles of the invention, a method may include receiving a search query; identifying a first set of documents to provide in response to the search query based on a second set of documents; and providing information relating to the identified first set of documents.

In yet still another implementation consistent with the principles of the invention, a method may include receiving feeds associated with blogs, extracting first information from the feeds, extracting second information from the blogs and associated posts, creating hybrid documents based on the first information and the second information, receiving a search query, determining a relevance of the blogs or posts to the search query based on the hybrid documents, and providing information relating to the blog or posts determined to be relevant.

BRIEF DESCRIPTION OF THE DRAWINGS

The accompanying drawings, which are incorporated in and constitute a part of this specification, illustrate an implementation of the invention and, together with the description, explain the invention. In the drawings.

FIG. 6 is a flow chart of an exemplary process for creating a hybrid document in an implementation consistent with the principles of the invention;

FIG. 7 is an exemplary configuration of a feed in an implementation consistent with the principles of the invention;

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Overview

Systems and methods consistent with the principles of the invention combine various documents relating to a blog to produce a hybrid document. When a search query is received, the hybrid document may be analyzed to determine the relevance of the blog to the search query.

Figure 1:
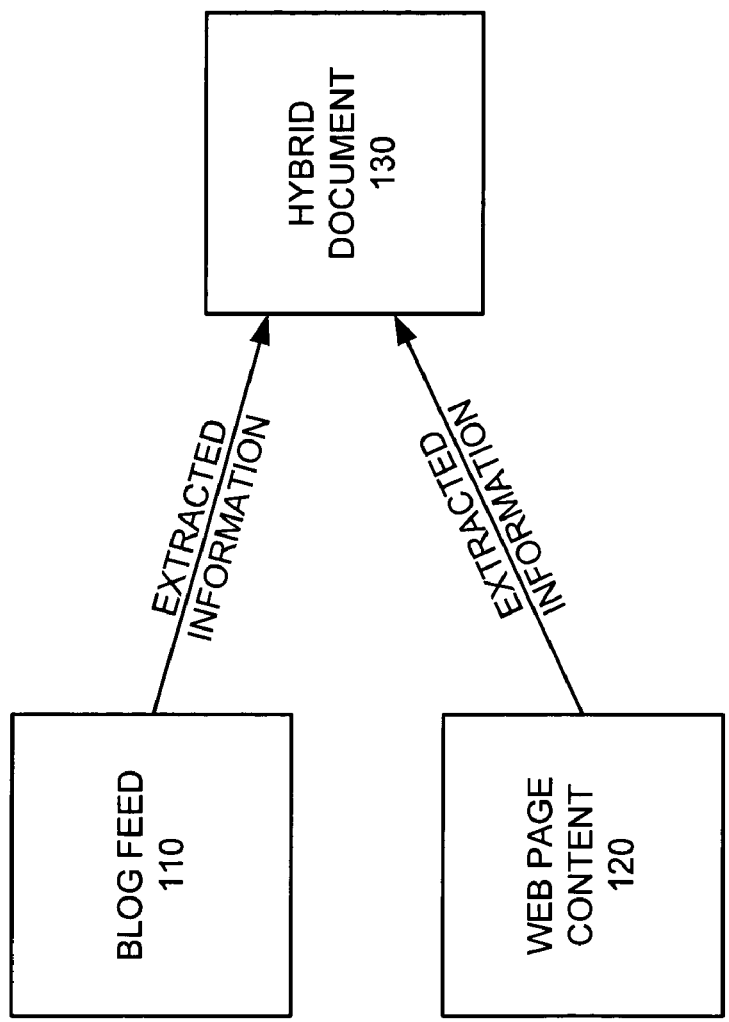
FIG. 1 is an exemplary diagram illustrating a concept consistent with the principles of the invention.

FIG. 1 is an exemplary diagram illustrating a concept consistent with the principles of the invention. As illustrated in FIG. 1, information may be extracted from a blog feed 110 for a particular blog. The information may include, for example, time stamps as to when a post within the blog was created and/or updated, the actual content of the post, the post's title, the post's author(s), the blog's author, the blog's title, the profile of the blog author, etc. Information may also be extracted from a document 120 (e.g., a web page) on which the blog is located. In one implementation, document 120 may be obtained based on information in feed 110 (e.g., feed 110 may identify the location of document 120). The information extracted from document 120 may include, for example, the author's profile, the content of the post, a blogroll, etc. In one implementation, information may also be extracted from one or more other documents to which document 120 links (e.g., an author's profile page). The information extracted from these sources may be combined to form a hybrid document 130 for the blog that may be used for determining the relevance of the blog and post to a received search query.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog or blog post, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
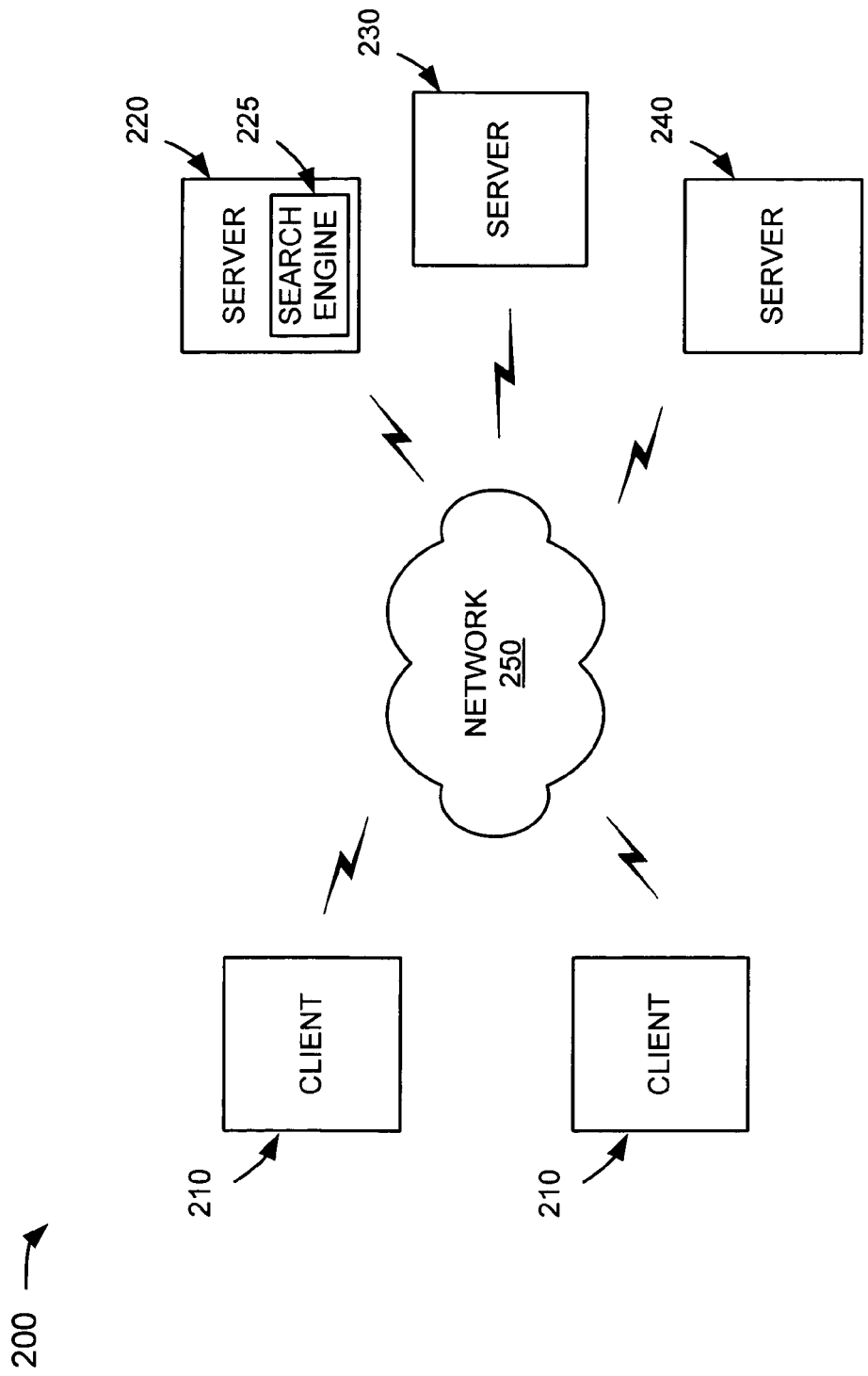
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a laptop, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a search engine 225 usable by clients 210. In one implementation, search engine 225 may be a blog search engine. Server 220 may crawl a corpus of documents, index the documents, and store information associated with the documents in a repository of documents. Servers 230 and 240 may store or maintain documents that may be crawled or analyzed by server 220.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
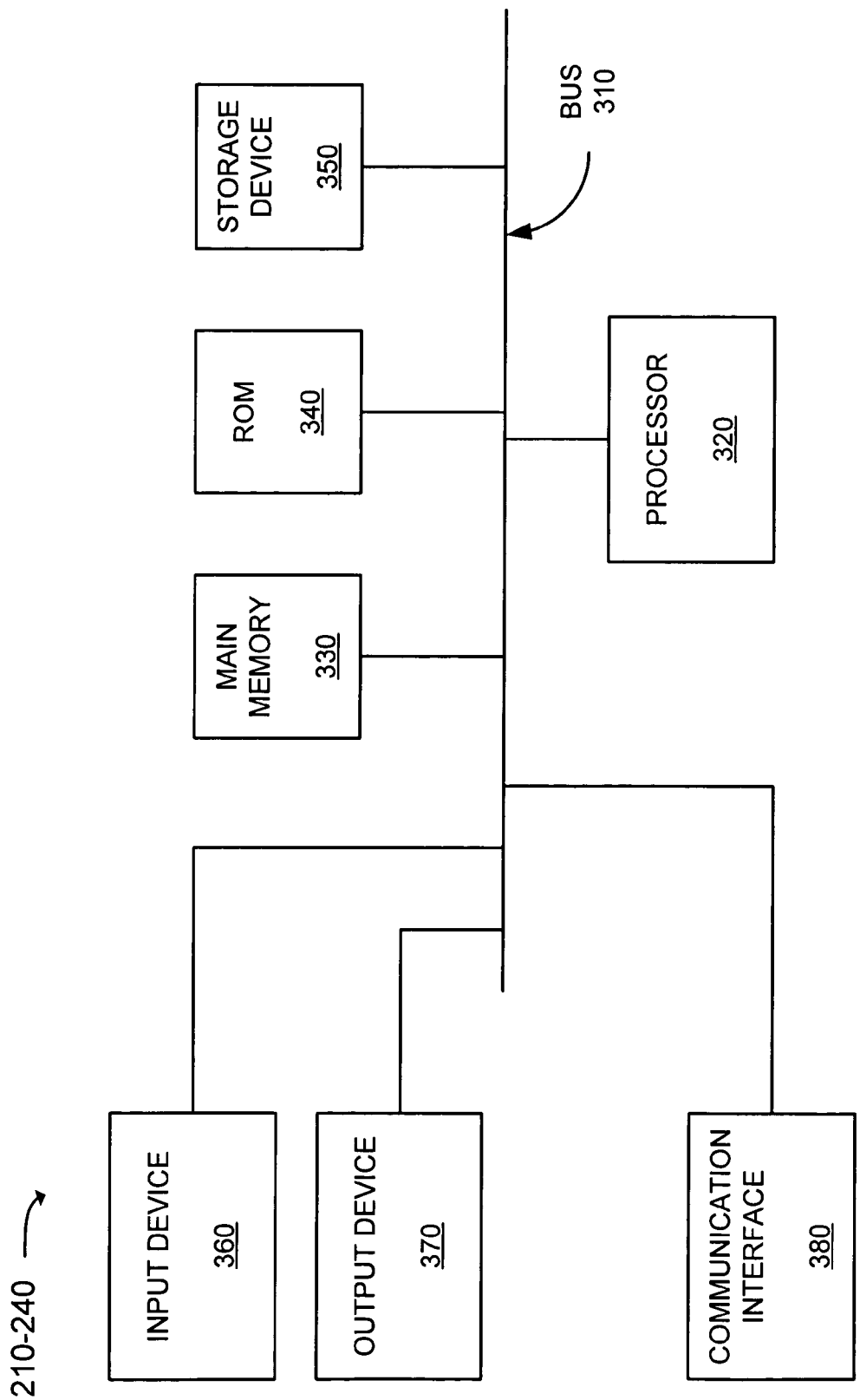
FIG. 3 is an exemplary diagram of a client or server entity in an implementation consistent with the principles of the invention.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain document processing-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

Figure 4:
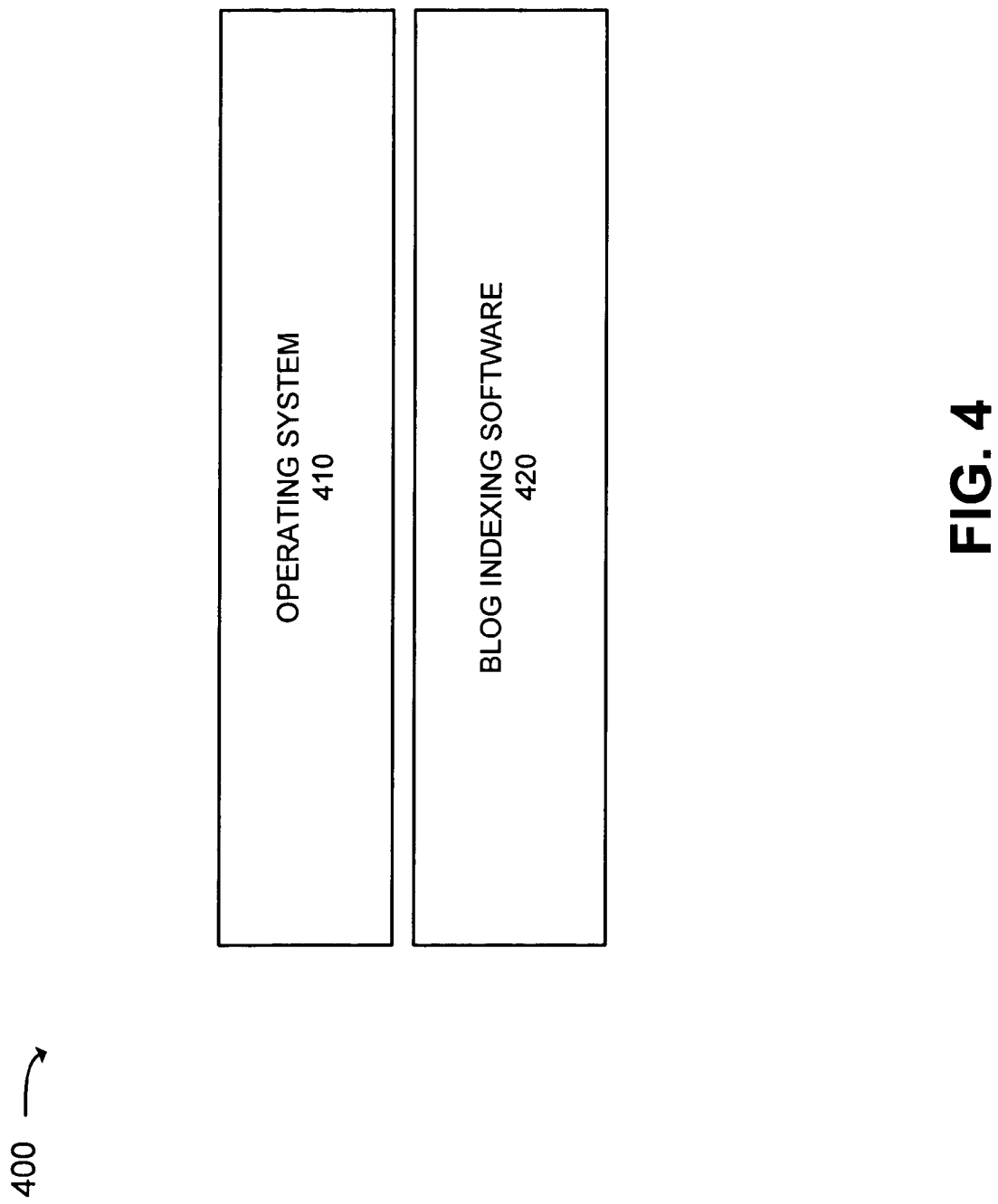
FIG. 4 is a diagram of a portion of an exemplary computer-readable medium that may be used by the server of FIG. 2.

FIG. 4 is a diagram of a portion of an exemplary computer-readable medium 400 that may be used by a server 220. In one implementation, computer-readable medium 400 may correspond to memory 330 of server 220. The portion of computer-readable medium 400 illustrated in FIG. 4 may include an operating system 410 and blog indexing software 420.

Operating system 410 may include operating system software, such as the Windows, Unix, or Linux operating systems. Blog indexing software 420 may include software that receives blog feeds and blog documents and predetermined information to be extracted from the feeds and documents. Blog indexing software 420 may also include software that forms hybrid blog documents using the extracted information.

Figure 5:
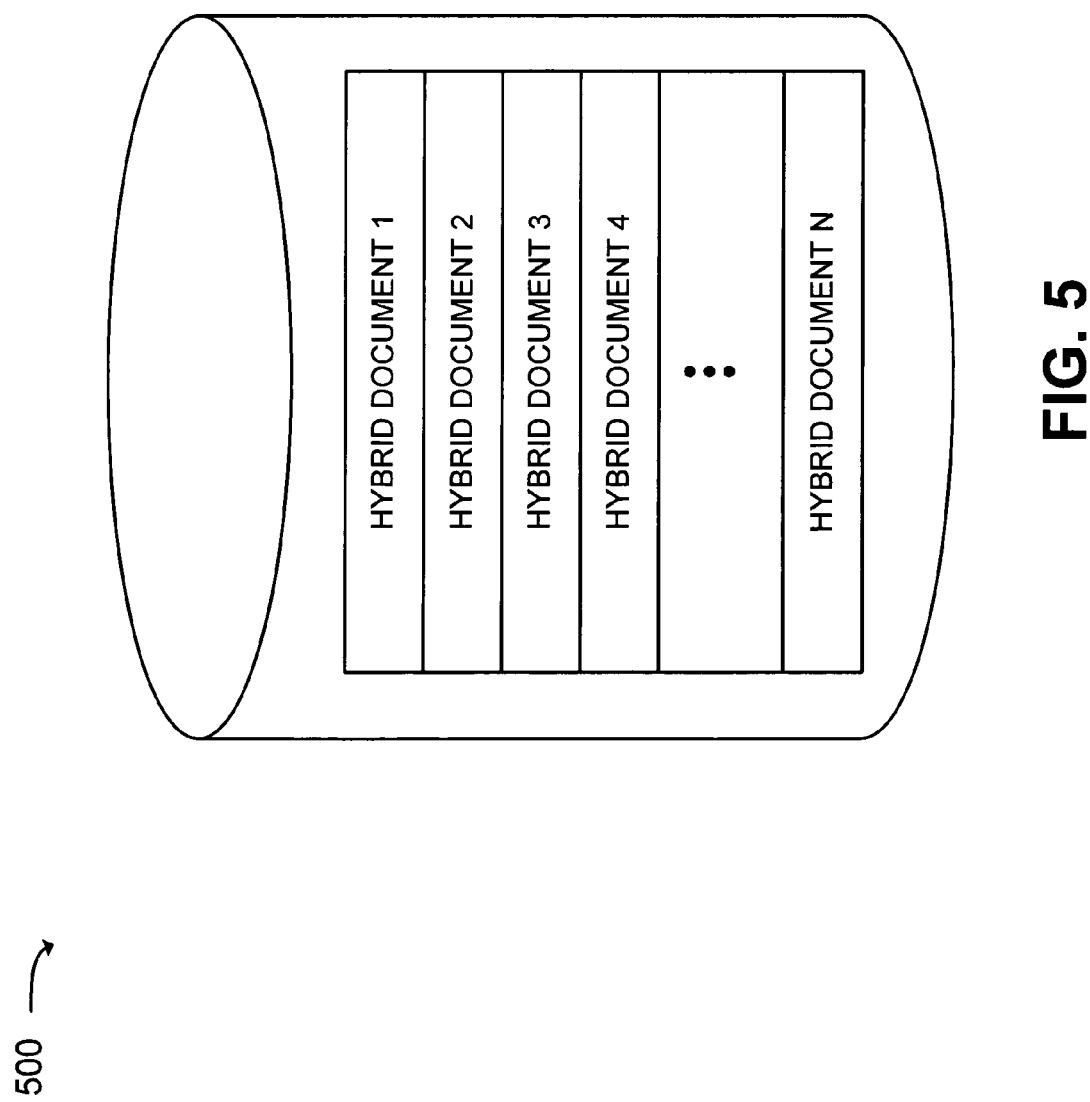
FIG. 5 is an exemplary database that may be associated with the server of FIG. 2 in an implementation consistent with the principles of the invention.

FIG. 5 is an exemplary database 500 that may be associated with server 220 in an implementation consistent with the principles of the invention. Database 500 may be stored locally at server 220, for example, in main memory 330 or storage device 350, or stored external to server 220 at, for example, a possibly remote location. As illustrated, database 500 may store a group of hybrid documents. These hybrid documents may include hybrid blog post documents (i.e., hybrid documents created from posts) and/or hybrid blog documents (i.e., hybrid documents created from blogs). Database 500 may be accessed to determine the relevancy of the blogs and blog posts corresponding to the hybrid documents to a search query received by server 220. It will be appreciated that database 500 may include other information (not shown) that aids in matching blogs and blog posts to search queries.

Moreover, it will be appreciated that database 500 may not actually store hybrid documents as independent entities, but rather may store an index of a corpus of hybrid documents. In this case, the hybrid documents may be virtual entities and not physical entities.

Exemplary Processing for Forming a Hybrid Document

FIG. 6 is a flow chart of an exemplary process for creating a hybrid document in an implementation consistent with the principles of the invention. The foregoing description focuses on creating a hybrid post document. It will be appreciated that the techniques described herein may also be used to create a hybrid blog document.

Processing may begin by receiving a feed associated with a blog (act 610). The feed may, for example, include a Rich Site Summary (RSS) feed, an Atom feed, and/or some other type of blog feed. The feed may include information regarding updates to a particular blog. For example, if an author of the blog adds a new post (i.e., entry) to the blog, a blog feed may be created that includes information regarding the new post. The information may include, for example, timestamps as to when the post was created and/or updated, the actual content of the post, a title of the post, an author of the post, an author of the blog, a title of the blog, a profile for the author of the blog, and/or other information regarding the post and/or blog.

Document(s) relating to the post may be obtained (act 620). For example, a blog document and a post document may be obtained. These documents may include a profile for the author of the blog, the content of the post, a blogroll (i.e., links to other blogs), and/or other information.

Information may be extracted from the blog feed and the blog and post documents (act 630). The information extracted from the blog feed may include, for example, timestamps as to when the post was created and/or updated, the actual content of the post, the title of the post, the author of the post, the author of the blog, the title of the blog, and the profile for the author of the blog, if available. The information extracted from the blog and post documents may include, for example, the profile for the author of the blog, the content of the post, and the blogroll.

In one implementation, information extracted from the blog feed may be compared to information extracted from the blog/post documents to determine whether the feed and/or blog/post documents are legitimate. For example, if the post content extracted from the blog feed does not match the post content extracted from the blog/post documents, this may be an indication that the feed and/or documents are not legitimate. That is, an individual may be attempting to spam a search engine into ranking that individual's blog/post more highly than it would ordinarily be ranked. In this situation, no hybrid document may be formed for this blog/blog post, or be given a very low rating.

In some situations, a blog document may contain links to other documents that may be relevant to the blog and/or post. For example, in some situations, a blog document may link to another document (or documents) that contains profile information for the author of the blog. The profile information may include the author's geographical location, age, gender, etc.

In one implementation, information may be extracted from these other documents (act 640). The information extracted from these other documents may include, for example, author profile information, such as a geographical location of the author. Other information may additionally be extracted.

A hybrid document may be created for the post based on the extracted information (act 650). In one implementation, the information extracted from the feed may be combined with the information extracted from the blog/post documents and the other documents associated with the blog document to create the hybrid document. As will be appreciated by one skilled in the art, the hybrid document is a document that cannot be retrieved by a user in response to a search query. Instead, the hybrid document may be used by a server, such as server 220, to determine the relevance of the post to a received search query.

Once the hybrid document has been created, it may be stored, for example, in database 500. In this manner, database 500 may be populated with hybrid documents relating to a set of posts. In some implementations, storing the hybrid document may include indexing the information extracted from the feed and blog/post documents and storing this extracted information in database 500 as part of an index.

Example

FIG. 7 is an exemplary feed 700 in an implementation consistent with the principles of the invention. In one implementation, feed 700 may be an Extensible Markup Language (XML) document that includes information about a new post within a blog. For explanatory purposes, feed 700, as illustrated in FIG. 7, includes information regarding the blog's title (i.e., "Goldtoe Lemon.Nut"); the author of the post (i.e., "Goldtoe"); timestamps as to when the post was created, modified, and issued; the title of the post; and the content of the post. Some or all of this information may be extracted from feed 700. As disclosed above, a typical feed may include more additional information than illustrated in FIG. 7.

Figure 8:
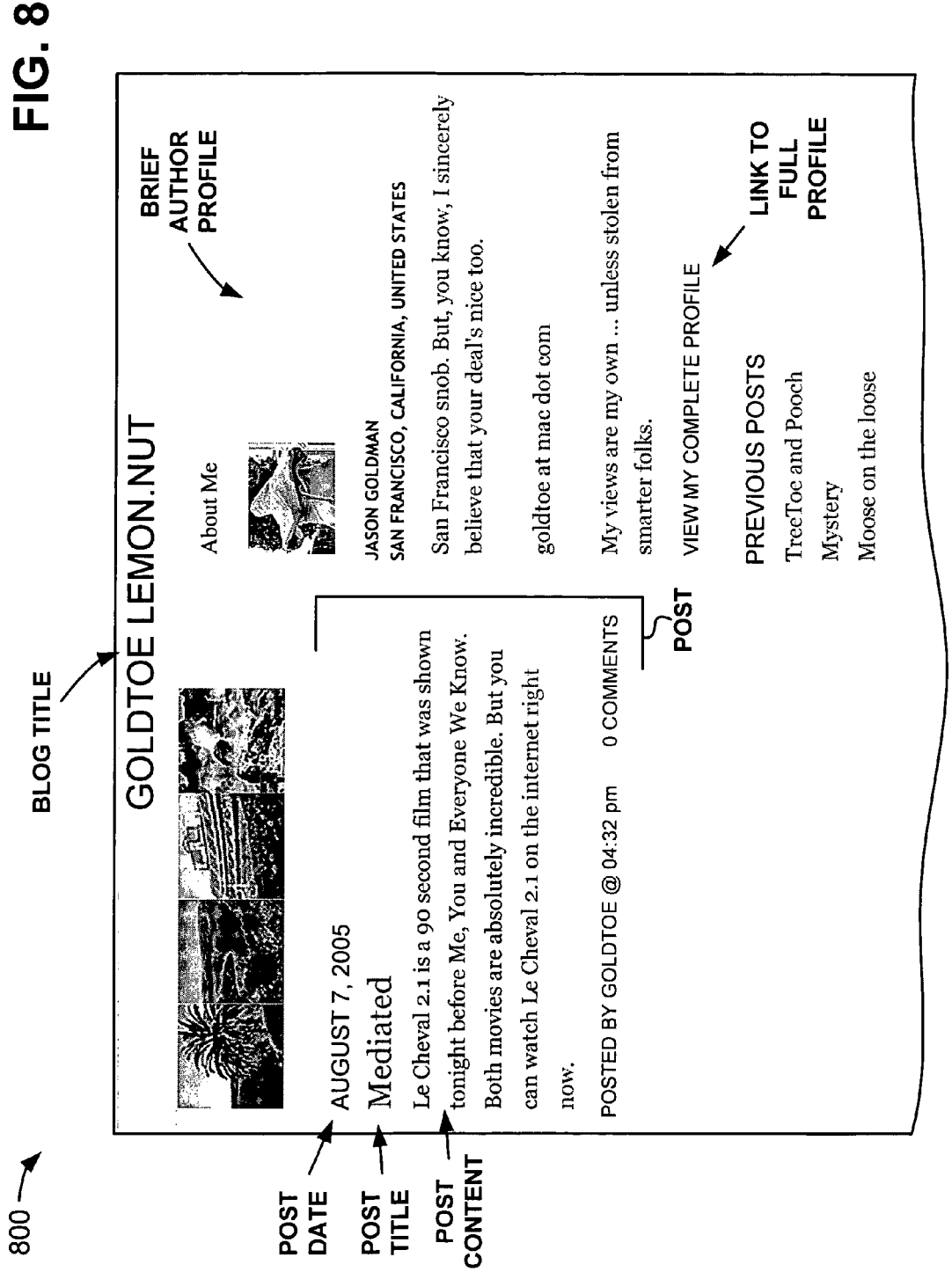
FIG. 8 is an exemplary configuration of a post document in an implementation consistent with the principles of the invention.

FIG. 8 is an exemplary configuration of a post document 800 in an implementation consistent with the principles of the invention. In one implementation, post document 800 may be a Hypertext Markup Language (HTML) document. Post document 800, as illustrated in FIG. 8, includes information regarding the blog's title (i.e., "Goldtoe Lemon.Nut"), a date of the post, a title of the post, the content of the post, a brief profile for the author, and a link to a full profile for the author. Some or all of this information may be extracted from post document 800. As disclosed above, a typical post document may include additional information than illustrated in FIG. 8.

Figure 9:
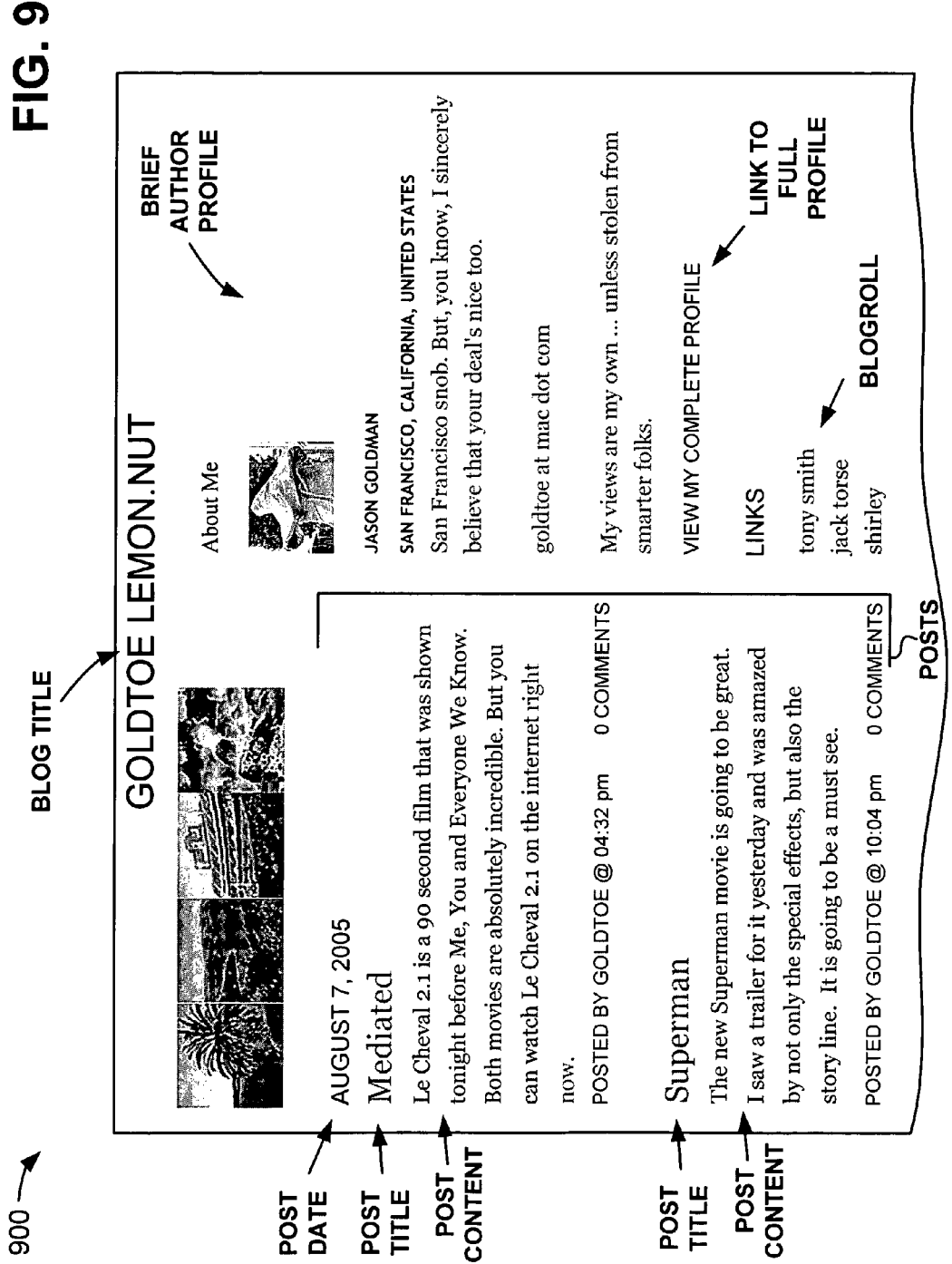
FIG. 9 is an exemplary configuration of a blog document in an implementation consistent with the principles of the invention.

FIG. 9 is an exemplary configuration of a blog document 900 that contains the blog corresponding to feed 700 in an implementation consistent with the principles of the invention. In one implementation, blog document 900 may be a Hypertext Markup Language (HTML) document. Blog document 900, as illustrated in FIG. 9, includes information regarding the blog's title (i.e., "Goldtoe Lemon.Nut"), a date of the post, a title of the post, the content of the post, a brief profile for the author, a link to a full profile for the author, and a blogroll. Some or all of this information may be extracted from blog document 900. As disclosed above, a typical blog document may include additional information than illustrated in FIG. 9.

Figure 10:
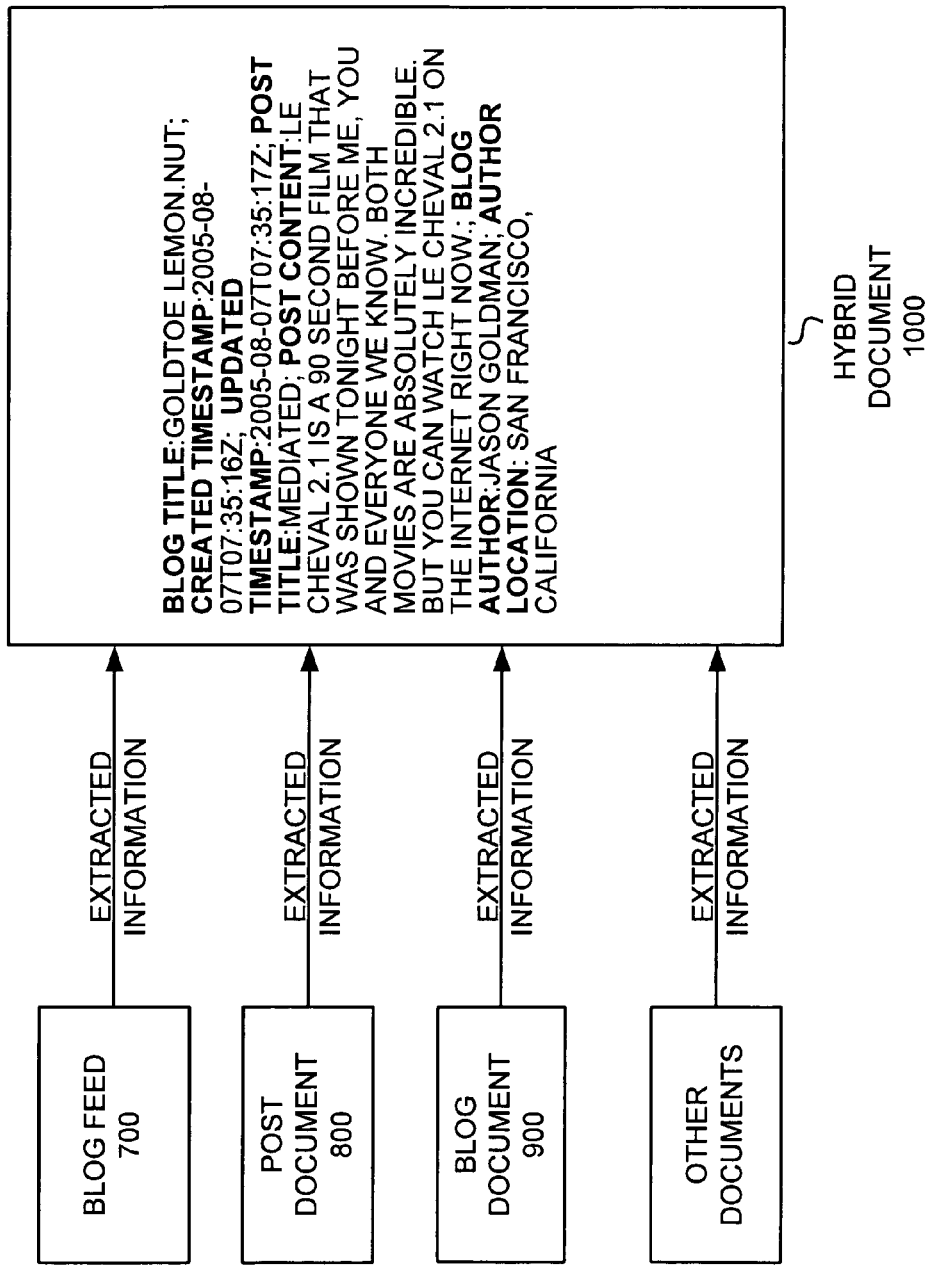
FIG. 10 depicts the formation of a hybrid document in an implementation consistent with the principles of the invention.

FIG. 10 depicts the formation of a hybrid document 1000 in an implementation consistent with the principles of the invention. As illustrated, hybrid document 1000 may be formed from feed 700, post document 800, blog document 900, and/or other documents related to blog document 900. Information may be extracted from any combination of these four sources. For example, hybrid document 1000 may be formed from feed 700, post document 800, and blog document 900; feed 700 and post document 800; feed 700 and blog document 900; post document 800 and blog document 900; or other combinations of these or other sources. Hybrid document 1000 may include some or all of the information extracted from feed 700, post document 800, blog document 900, and other documents related to blog document 900. This extracted information improves the ability of a search engine to determine whether the post is relevant to a received search query. As set forth above, hybrid document 1000 may be a physical entity or a virtual entity stored in database 500.

Presenting Search Results

Figure 11:
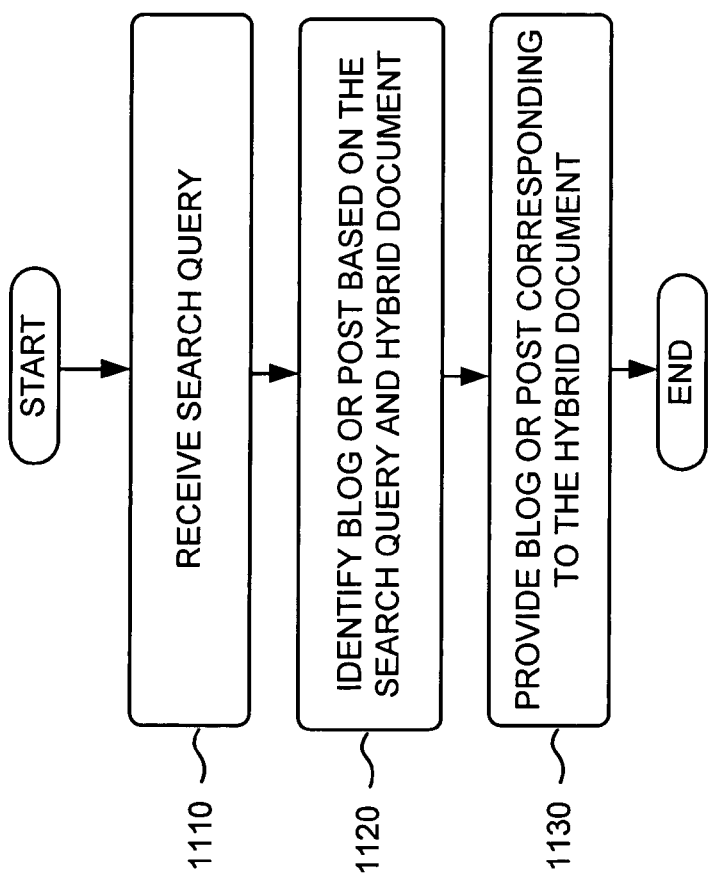
FIG. 11 is a flowchart of an exemplary process for presenting search results in an implementation consistent with the principles of the invention.

FIG. 11 is a flowchart of an exemplary process for presenting search results. In one implementation, the processing of FIG. 11 may be performed by one or more software and/or hardware components within server 220. In another implementation, the processing may be performed by one or more software and/or hardware components within another device or a group of devices separate from or including server 220.

Processing may begin with a search query being received (act 1010). For example, the user may provide a search query into a search box associated with a search engine (e.g., entering a search term into a search engine interface or a search box of an add-on toolbar). The web browser (or the add-on toolbar) may send the search query to a search engine, such as search engine 225 associated with server 220.

A list of blogs/blog posts may be identified based on the search query (act 1020). For example, server 220 may determine an information retrieval (IR) score for the blogs/blog posts. The IR score for a blog/blog post may be determined based on a matching of the search terms of a search query to an index created based on the above-discussed hybrid documents. There are a number of known techniques that may be used to determine the IR score for a document. For example, the IR score may be determined based on the number of occurrences of the search terms in the document. Alternatively or additionally, the IR score may be determined based on where the search terms occur within the document (e.g., title, content, etc.) or characteristics of the search terms (e.g., font, size, color, etc.). Alternatively or additionally, a search term may be weighted differently from another search term when multiple search terms are present. Alternatively or additionally, the proximity of the search terms when multiple search terms are present may influence the IR score. Yet other techniques for determining the IR score for a document are known to those skilled in the art.

Server 220 may assign scores to the blogs/blog posts, sort the blogs/blog posts based on their scores, and form a list of search result documents based on the sorted blogs/blog posts. In one implementation, the list of search result documents includes links to the posts or the blogs that host the posts. The list of search result documents do not include links to the hybrid documents since these hybrid documents, as indicated above, are not documents that are retrievable by a user in response to a search query. Instead, these hybrid documents allow for blogs and blog posts to be more accurately matched to received search queries, allowing for higher quality results to be provided to users. Upon selection of a document in the list of search results, the user may be provided with the selected blog or post (act 1030).

As an example of the above processing, assume that a user is interested in blogs from people who live in San Francisco. The user might transmit the search query "San Francisco" to a search engine, such as search engine 225. Search engine 225 may, for example, compare the terms in the search query (or variations thereof) to the index stored in database 500 and identify a set of documents that match the query. Assume that the blog corresponding to document 900 (FIG. 9) is included in the identified set of documents since the author's profile, which is included in a document associated with blog document 900, indicates that the author is located in San Francisco. Search engine 225 may provide the user with a list of search results that include links to blogs and/or blog posts. The list may include post document 800 and/or blog document 900 and not the actual document that includes the author's profile since that document is more than likely not of interest to the user (i.e., the user is likely interested in the blog from a blogger that is located in San Francisco and not a profile document that indicates that the user lives in San Francisco).

CONCLUSION

Implementations consistent with the principles of the invention use hybrid documents to improve blog searching.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 6 and 11, the order of the acts may be modified in other implementations consistent with the principles of the invention. Further, non-dependent acts may be performed in parallel.

The preceding description refers to a user. A "user" is intended to refer to a client, such as a client 210 (FIG. 2), or an operator of a client.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
    fetching, by one or more processors associated with the one or more server devices, first information from a post to a blog that includes a plurality of posts;
    extracting, by one or more processors associated with the one or more server devices, second information, associated with the blog, from a source different than the posts included in the blog;
    creating, by one or more processors associated with the one or more server devices, a hybrid document by combining the first information and the second information; and
    using, by one or more processors associated with the one or more server devices, the hybrid document to determine a relevance of the post to a search query.

2. The method of claim 1 where the source includes a Rich Site Summary (RSS) feed, an Atom feed, or other structured representation of information contained in the blog.

3. The method of claim 1 where the extracting the second information includes:
    extracting, from a feed, at least one of a title of the blog, an author of the blog, or a profile of the author of the blog.

4. The method of claim 3 where the extracting the second information further includes:
    extracting, from the blog, at least one of a profile of the author of the blog or a blogroll.

5. The method of claim 1 where the source includes a document to which the blog links.

6. The method of claim 5 where the document includes a profile of an author of the blog.

7. The method of claim 1 further comprising:
    storing the hybrid document in an index.

8. A computer-implemented system comprising:
    means for extracting first information from a post to a blog;
    means for extracting second information, associated with the blog, from a source different than the post to the blog;
    means for creating a hybrid document by combining the first information and the second information;
    means for storing the hybrid document in a searchable index; and
    means for using the searchable index to determine a relevance of the post to a search query.

9. A computer-implemented device comprising:
    a memory storing computer readable instructions; and
    one or more processors to execute the computer-readable instructions to implement:
        logic to extract first information from a post to a blog;
        logic to extract different second information from at least one of an update feed or the blog, where the second information includes information that is not included in any post to the blog;
        logic to create a hybrid document using the first information and the second information;
        logic to store the hybrid document in a searchable index; and
        logic to use the searchable index to determine a relevance of the post to a search query.

10. A computer-readable memory device that includes instructions to control a processor, the instructions comprising:
    a set of instructions to extract information from each of at least two different sources, the at least two different sources including;
    a post to a blog, and
    at least one of a feed associated with the blog, the blog, or a document to which the blog links,
    where the information extracted from the at least one of the feed, the blog, or the document to which the blog links includes information that is different from information that is part of any post to the blog;
    a set of instructions to create a hybrid document that includes information from the post and from at least one of the feed, the blog, or the document to which the blog links;
    a set of instructions to store the hybrid document in a searchable index; and
    a set of instructions to use the searchable index to determine a relevance of the post to a search query.

11. A method performed by one or more server devices, the method comprising:
    receiving, by one or more processors of the one or more server devices, a search query;
    determining, by one or more processors of the one or more server devices, a relevance, to the search query, of a blog or a post to the blog using a searchable index, the searchable index being formed by combining information extracted from the post to the blog and information extracted from a source that is associated with the blog but is not associated with any posts to the blog; and
    providing, by one or more processors of the one or more server devices, information regarding the blog or the post to a client device when the blog or the post is determined to be relevant to the search query.

12. The method of claim 11 where the source includes a Rich Site Summary (RSS) feed, an Atom feed, or other structured representation of information contained in the blog.

13. The method of claim 11 where the source includes the blog.

14. The method of claim 13 where the source includes an update feed and the blog,
    where the information extracted from the update feed includes at least one of a title of the blog, an author of the blog, or a profile of the author of the blog, and
    where the information extracted from the blog includes at least one of the title of the blog, the profile of the author of the blog, or a blogroll.

15. The method of claim 11 where the source includes a document to which the blog links.

16. The method of claim 15 where the document includes a profile of an author associated with the blog.

17. The method of claim 16 where the profile includes geographical information relating to the author.

18. A device comprising:
    a memory to store instructions; and
    a processor to execute the instructions to:
        receive a search query, determine a relevance of a blog or a blog post to the search query, the determination of relevance being based on a searchable index that includes information extracted from the blog post and information extracted from a source that is associated with the blog but is not associated with any post to the blog, and provide information relating to the blog or the blog post when the blog or the blog post is determined to be relevant to the search query.

19. A computer-readable memory device that includes instructions to control a processor, the instructions comprising:

a set of instructions to determine a relevance of a blog or blog post to a search query, the relevance being based on a searchable index that is formed by combining information extracted from the blog post and information extracted from at least one other source, the information extracted from the at least one other source including information that is different than information that is part of any blog post of the blog; and a set of instructions to provide information relating to the blog or blog post when the blog or blog post is determined to be relevant to the search query.

20. A method performed by one or more server devices, the method comprising:

receiving, by the one or more server devices, a search query;

determining, by one or more processors of the one or more server devices, a relevance of a first set of documents to the search query by using a second set of documents, where the first set of documents includes blogs and blog posts and the second set of documents includes hybrid documents, where a particular hybrid document includes:

first information from a particular blog post from the first set of documents, and second information from linked documents to which the blogs link, where the information from linked documents includes information not contained in blog posts; and providing, by one or more processors of the one or more server devices, information regarding documents in the first set of documents determined to be relevant.

21. The method of claim 20 where the hybrid documents are further created from feeds associated with the blogs.

22. A method performed by one or more server devices, the method comprising:

receiving, by the one or more server devices, a search query;

identifying, by one or more processors of the one or more server devices, a first set of documents to provide in response to the search query, the identifying being based on a second set of documents, the first set of documents including blogs or blog posts and the second set of documents including hybrid documents created from the first set of documents and a third set of documents to which the blogs link, where the third set of documents does not include blog posts; and providing, by one or more processors of the one or more server devices, information relating to the identified first set of documents.

23. The method of claim 22 where the hybrid documents are further created from feeds associated with the blogs.

24. A method for indexing blog posts for a search engine, the method comprising:

parsing, by one or more server devices, a home page of a blog to obtain first and second information that relates to the blog, where the obtained first information is obtained from a blog post to the blog, where the obtained second information is obtained from a source different than posts included in the blog;

indexing, by the one or more server devices, a subsequently received post to the blog based on the contents of the subsequently received post, the obtained first information, and the obtained second information that is obtained from the source different than posts included in the blog; and determining the relevance of the blog post to a search query based on the indexing.

25. A method performed by one or more server devices, the method comprising:

receiving, by the one or more server devices, feeds associated with blogs;

extracting, by one or more processors of the one or more server devices, first information from the feeds;

extracting, by one or more processors of the one or more server devices, second information from the blogs and associated posts;

extracting, by one or more processors of the one or more server devices, third information from documents to which the blogs link, where the third information includes information that is not specific to a particular blog post;

creating, by one or more processors of the one or more server devices, a searchable index by combining one or more portions of the first information, one or more portions of the second information, and one or more portions of the third information;

receiving a search query;

determining a relevance of the blogs or posts to the search query based on the searchable index; and providing blogs or posts determined to be relevant.

26. The computer-implemented system of claim 8, where the source includes the blog, and where the means for extracting the second information includes:

means for extracting at least one of a title of the blog, an author of the blog, a profile of the author of the blog, or a blogroll from the blog.

27. The computer-implemented system of claim 8, further comprising:

means for extracting third information from a document to which the blog links, and where the means for creating a hybrid document includes:

creating the hybrid document by combining the first information, the second information, and the third information.

28. The computer-implemented device of claim 9, where the logic to extract information from the at least one of the update feed or the blog includes:

logic to extract at least one of a title of the blog, an author of the blog, a profile of the author of the blog, or a blogroll.

29. The computer-implemented device of claim 9, where the one or more processors are further to execute the computer-readable instructions to implement:

logic to extract information from a document to which the blog links, and where the logic to create a hybrid document includes:

logic to create the hybrid document using the information extracted from the at least one of the update feed or the blog, the information extracted from the post, and the information extracted from the document to which the blog links.

30. The computer-readable memory device of claim 10, where the extracting information from the post to the blog includes:
   extracting at least one of content of the post, a title of the post, an author of the post, or one or more timestamps associated with the post.

31. The device of claim 18, where the source includes an update feed.

32. The device of claim 31, where the source further includes the blog,
   where the information extracted from the update feed includes a title of the blog, an author of the blog, or a profile of the author of the blog, and
   where the information extracted from the blog includes at least one of the profile of the author of the blog, or a blogroll.

33. The computer-readable memory device of claim 19, where the at least one other source includes a document to which the blog links.

34. The computer-readable memory device of claim 19, where the at least one other source includes an update feed associated with the blog.

35. The method of claim 24, where the obtained second information includes at least one of a profile of an author of the blog or a blogroll.

36. The method of claim 24, further comprising:
   receiving a search query, and
   determining a score for the subsequently received post based on the indexing.

37. The method of claim 25, where the extracted first information includes at least one of content of the associated posts, titles of the associated posts, authors of the associated posts, or one or more timestamps associated with the associated posts.

38. The method of claim 37, where the extracted second information includes at least one of, profiles of the authors of the blogs, or blogrolls.

* * * * *